US011097410B2

United States Patent
Baxivanelis (10) Patent No.: US 11,097,410 B2
(45) Date of Patent: Aug. 24, 2021

(54) BATTERY-POWERED HAND-HELD MACHINE TOOL

(71) Applicant: Hilti Aktiengesellschaft, Schaan (LI)

(72) Inventor: Konstantin Baxivanelis, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 495 days.

(21) Appl. No.: 16/063,039

(22) PCT Filed: Dec. 13, 2016

(86) PCT No.: PCT/EP2016/080738
§ 371 (c)(1),
(2) Date: Jun. 15, 2018

(87) PCT Pub. No.: WO2017/102690
PCT Pub. Date: Jun. 22, 2017

(65) Prior Publication Data
US 2018/0361562 A1 Dec. 20, 2018

(30) Foreign Application Priority Data
Dec. 17, 2015 (EP) .................................. 15200665

(51) Int. Cl.
*B25F 5/02* (2006.01)
*B23D 45/16* (2006.01)
(Continued)

(52) U.S. Cl.
CPC ................ *B25F 5/02* (2013.01); *B23D 45/16* (2013.01); *B23D 47/00* (2013.01); *B23D 47/08* (2013.01);
(Continued)

(58) Field of Classification Search
CPC ........... B25F 5/02; B23D 45/16; B23D 47/12; B23D 47/08; B23D 47/00; B27B 9/02; B27B 9/00
See application file for complete search history.

(56) References Cited

U.S. PATENT DOCUMENTS 4,555,849 A 12/1985 Ando et al.
6,161,293 A 12/2000 Watson
(Continued)

FOREIGN PATENT DOCUMENTS

CN 1479668 A 3/2004
CN 101124062 A 2/2008
(Continued)

OTHER PUBLICATIONS

English machine translation CN 103299835 A, which was previously cited as B1 on Jun. 15, 2018 (Five (5) pages).
(Continued)

*Primary Examiner* — Hwei-Siu C Payer
(74) *Attorney, Agent, or Firm* — Crowell & Moring LLP (57) ABSTRACT

A battery-powered hand-held machine tool, particularly a hand-held circular saw, includes an electric motor for rotational driving a tool arranged on the hand-held machine tool, particularly a saw blade, a front handle and a rear handle each in terms of an advancing direction of the hand-held machine tool, and a receiving recess for receiving a replaceable battery. The rear handle is mounted such that it can pivot out, preferably upwards, about a pivot axis such that when the rear handle is in a state of being pivoted out, the receiving recess for receiving or removing the replaceable battery is exposed and, when the rear handle is in a state of being pivoted in, the reception or removal of the replaceable battery into or out of the receiving recess is blocked.

15 Claims, 6 Drawing Sheets

(51) Int. Cl.
  *B23D 47/00*    (2006.01)
  *B27B 9/00*    (2006.01)
  *B23D 47/08*    (2006.01)
  *B27B 9/02*    (2006.01)
  *B23D 47/12*    (2006.01)

(52) U.S. Cl.
  CPC ............... *B27B 9/00* (2013.01); *B27B 9/02* (2013.01); *B23D 47/12* (2013.01)

(56) References Cited

U.S. PATENT DOCUMENTS

| | | |
|---|---|---|
| 6,329,788 B1 | 12/2001 | Bailey, Jr. et al. |
| 8,011,357 B2 | 9/2011 | Johansson |
| 8,424,213 B2 | 4/2013 | Fukinuki |
| 8,919,235 B2 | 12/2014 | Sudou et al. |
| 2004/0042908 A1 | 3/2004 | Donnerdal |
| 2015/0165640 A1 | 6/2015 | Rosskamp et al. |
| 2017/0203462 A1* | 7/2017 | Haneda ............... B27B 17/08 |
| 2018/0361562 A1* | 12/2018 | Baxivanelis ........... B23D 45/16 |
| 2018/0370015 A1* | 12/2018 | Baxivanelis ............. B27B 9/00 |

FOREIGN PATENT DOCUMENTS

| | | |
|---|---|---|
| CN | 201483079 U | 5/2010 |
| CN | 101817106 A | 9/2010 |
| CN | 101837488 A | 9/2010 |
| CN | 103299835 B | 12/2014 |
| EP | 0 310 508 A2 | 4/1989 |
| EP | 3 181 280 A1 * | 6/2017 |
| EP | 3 181 305 A1 * | 6/2017 |
| EP | 3 181 306 A1 * | 6/2017 |

OTHER PUBLICATIONS

PCT/EP2016/080738, International Search Report (PCT/ISA/220 and PCT/ISA/210) dated Mar. 20, 2017, with partial English translation, enclosing Written Opinion of the International Searching Authority (PCT/ISA/237) (Fourteen (14) pages).

U.S. Appl. No. 16/062,998, "Battery-Powered Handheld Machine Tool", filed Jun. 15, 2018, Inventor Konstantin Baxivanelis.

\* cited by examiner

BATTERY-POWERED HAND-HELD MACHINE TOOL

CROSS REFERENCE TO RELATED APPLICATIONS

This application claims the priority of International Application No. PCT/EP2016/080738, filed Dec. 13, 2016, and European Patent Document No. 15200665.6, filed Dec. 17, 2015, the disclosures of which are expressly incorporated by reference herein.

BACKGROUND AND SUMMARY OF THE INVENTION

The present invention relates to a battery powered hand-held machine tool, particularly a hand-held circular saw, comprising an electric motor for rotationally driving a tool arranged on the hand-held machine tool, particularly a saw blade. The hand-held machine tool has, each in terms of an advancing direction of the hand-held machine tool, a front and rear handle. Furthermore, the hand-held machine tool has a receiving recess for receiving a replaceable battery. The replaceable battery is used to supply the electric motor.

Such hand-held machine tools are basically known from the prior art. Also known from the prior art are hand-held machine tools in the form of hand-held circular saws, whose electric motor is designed to drive a tool, for example in the form of a saw blade, of the hand-held machine tool machine, e.g. via a worm gear. In such hand-held machine tools designed as a hand-held circular saws, which are known particularly from the USA and are typically referred to as a "worm-drive saw" (WDS), the worm gear allows a right-angled arrangement of the motor shaft (worm shaft) and the tool axis, i.e. saw blade axis (output shaft for the sawblade). As a result, hand-held circular saws designed as WDSs have an elongate, less wide shape than "side winder" (SW) preferred in Europe, in which the motor axis and saw blade axis are arranged coaxially, but at least parallel to one another.

The object of the present invention is to provide a hand-held machine tool, particularly a hand-held circular saw, with improved handling.

The object is achieved in that the rear handle is mounted about a pivot axis so that it can pivot out upwards, such that when the rear handle is in a state of being pivoted out, the receiving recess is released for inserting or removing the replaceable battery, and if the rear handle is in a state of being pivoted in, the receiving or removal of the replaceable battery into or out of the receiving recess is blocked.

Advantageously, the battery-powered hand-held machine tool according to the invention allows particularly easy receiving or removal of a replaceable battery. For this reason, the hand-held machine tool according to the invention has improved handling compared to that of battery-powered hand-held machine tools known from the prior art, especially hand-held circular saws.

The invention further includes the recognition that the elongated, less broad shape of the hand-held circular saws known from the prior art, constructed as WDS, requires top-heavy ergonomics, which are preferred for so-called "drop cuts," i.e., cuts in a vertical direction from top to bottom. Because the receiving recess for receiving the replaceable battery can be released by pivoting the rear handle, the preferred ergonomics of a hand-held circular saw designed as a WDS are constructively favored in addition to the already mentioned advantageous simple battery change.

Preferably, a length of the hand-held machine tool along the advancing direction is at least twice as large as a width of the hand-held machine tool transverse to the advancing direction. The advancing direction is to be understood in the context of the present invention, a direction of thrust when working properly with the hand-held machine tool, i.e. in particular not a possibly temporarily adopted direction of thrust for releasing a jammed tool, particularly a saw blade, from a workpiece.

In a particularly preferred embodiment, the pivot axis is oriented parallel to a rotational axis of the tool. The pivot axis preferably runs above, preferably exclusively above, a ground plane or a parallel plane parallel to this ground plane. The ground plane can be defined by an underside of a floor plate of the hand-held machine tool that is in a zero-degree position and/or has been set to a maximum depth of cut by a workpiece that is in contact during operation. The floor plate is located in the zero-degree position when the underside of the floor plate contacting a workpiece during operation is perpendicular to the tool, particularly to a flat saw blade.

The parallel plane parallel to the ground plane preferably is at a distance from the ground plane; the axis of rotation of the tool is preferably in the parallel plane.

It has proved to be advantageous if the pivot axis, preferably exclusively, extends in an inward-facing side of an axial plane facing the rear handle. The axial plane is preferably defined by the axis of rotation and a radius of the tool, wherein the axial plane, preferably starting from a section of the floor plate lying in the advancing direction in front of the axis of rotation, and in the direction of rotation of the tool, encloses an angle of at least 70° and preferably at most 90°.

Also preferably, the pivot axis extends exclusively in a spatial region which is enclosed by a lateral surface of a cylinder coaxial with the axis of rotation of the tool. It has proven to be advantageous if the cylinder has a diameter which is at most 2.5 times as large as a maximum possible tool diameter of a respective hand-held machine tool. The diameter may alternatively be at most 1.5 times as large as a maximum possible tool diameter of a respective hand-held machine tool.

The pivot axis may, preferably exclusively, extend in an inward-facing side of a handle plane facing the front handle. Preferably, the handle plane is defined by the axis of rotation and a radius of the tool, wherein the handle plane, starting from a section of the floor plate lying in the advancing direction behind the rotation axis and counter to the direction of rotation of the tool, encloses an angle of at least 20° and preferably at least 30°.

It should be expressly pointed out at this point that the currently defined positional states of the pivot axis can apply both individually and in combination. For example, the handle plane, the axial plane and the lateral surface form an area in the form of a three-dimensional pie slice in which the pivot axis is arranged or to be arranged.

In a preferred embodiment, the pivot axis extends through a handle carrier of the front handle. The pivot axis can be supported by a cylindrical pin, which is formed in a pin receptacle preferably formed in the grip carrier. The handle carrier of the front handle may be part of a housing of the hand-held machine tool or be attached to such.

It has proven to be advantageous if a pivot angle limited by a pivot stop and a counter stop between the state of being pivoted in and pivoted out of the rear handle, starting from a section of the floor plate located in the advancing direction behind the axis of rotation and counter to the direction of rotation of the tool, is greater than 20° and less than 60°.

Preferably, the hand-held machine tool has a latching mechanism which is designed to securely hold the rear handle in the state of being pivoted out, preferably until the overcoming of a spring-locking force by the user.

The spring-locking force can be formed for example by a pressure piece with ball and spring and at least one corresponding detent recess. Preferably, such a mechanism is formed near the pivot axis, which allows a particularly compact structure. The latching mechanism may alternatively be formed by a magnetic pairing, preferably in the region of the pivot stop and/or the counter-stop. It is also possible to realize the locking mechanism by means of loop spring friction. Each of these options is configured such that the rear handle is held securely in the state of being pivoted out until a force applied by the user to the rear handle overcomes the spring-locking force of the detent mechanism.

In a particularly preferred embodiment, the rear handle on a locking mechanism which is adapted to fix the rear handle in its state of being pivoted in and/or released, if necessary, for a pivoting movement. It has proven to be advantageous if a stabilizing rail is arranged below the receiving recess, which preferably projects counter to the advancing direction beyond the receiving recess and to which the rear handle can be preferably fixed in its state of being pivoted in.

A fixation of the rear handle in its state of being pivoted in on the stabilizing rail allows a high stability of the rear handle and thus an optimal power flow in the advancing direction of the hand-held machine tool.

It has proved to be advantageous if the locking mechanism comprises a mechanical switching element which can engage in a recess provided for this, which is preferably formed on the stabilizing rail. This is preferably when the rear handle is in the state of being pivoted in. About such a locking mechanism, the rear handle is locked so that a particularly safe operation of the hand-held machine tool is achieved by avoiding unwanted pivoting of the rear handle. The locking mechanism can be designed such that it locks automatically in the state of being pivoted in. Alternatively, the locking mechanism may be configured to be locked by the actuation of a control element by the user.

Preferably, the safety of the hand-held machine tool is increased in that it has a safety switch which is connected to the rear handle and is designed to interrupt a power supply to the electric motor in the unlocked state of the locking mechanism and/or the presence of the state of being pivoted out. The safety switch can immediately interrupt the main power supply of the hand-held machine tool or electronically transmit the state of the locking mechanism and prevent startup of the hand-held machine tool, especially a saw, via logic provided in the electronics, despite pressing of the on/off switch.

The safety switch can be electrical, magnetic and/or optical. Several options of arranging the safety switch are conceivable. The safety switch may, for example, be part of the mechanical switching element or be mechanically connected thereto. Alternatively or additionally, the safety switch can be arranged in the region of the pivot axis of the rear handle. Alternatively or additionally, it is conceivable to arrange the safety switch in a region of the rear handle, which in the state of being pivoted in of the rear handle is in contact with a replaceable battery received in the receiving recess. It has been found to be advantageous to design a safety switch as part of the mechanical switching element.

In a further preferred embodiment, the receiving recess has a rail guide over which the replaceable battery can be received into the receiving recess and removed from it. Preferably, the rail guide and/or the replaceable battery are designed such that extraction of the replaceable battery is possible only after actuation of a release element. Preferably, the release element is designed as a button and arranged on the replaceable battery.

It has also proven to be advantageous if a hand engagement surface of the rear handle, based on the advancing direction of the hand-held machine tool, is added behind the replaceable battery received in the receiving recess. In a particularly preferred embodiment, the tool, based on the advancing direction of the hand-held circular saw, is arranged left or right of the electric motor. The output shaft of the electric motor can run parallel to the axis of rotation of the tool, particularly of the saw blade. The hand-held machine tool, particularly as a hand-held circular saw, is preferably at least twice as long as it is wide. Preferably, the hand-held machine tool is free of a worm gear. In this way, the hand-held machine tool designed, for example, as a battery-powered hand-held circular saw, can achieve the ergonomics of a handheld hand-held machine tool provided as a WDS and configured in the form of a hand-held circular saw.

Further advantages arise from the following description of the figures. In the figures, various embodiments of the present invention are shown. The figures, the description and the claims contain numerous features in combination. The person skilled in the art will expediently also consider the features individually and combine them to form further reasonable combinations.

In the figures, the same and similar components are numbered with the same reference numerals.

BRIEF DESCRIPTION OF THE DRAWINGS

FIG. 5 is a further perspective view of the view of the embodiment of FIG. 3 with rear handle pivoted in.

DETAILED DESCRIPTION OF THE DRAWINGS

Figure 1:
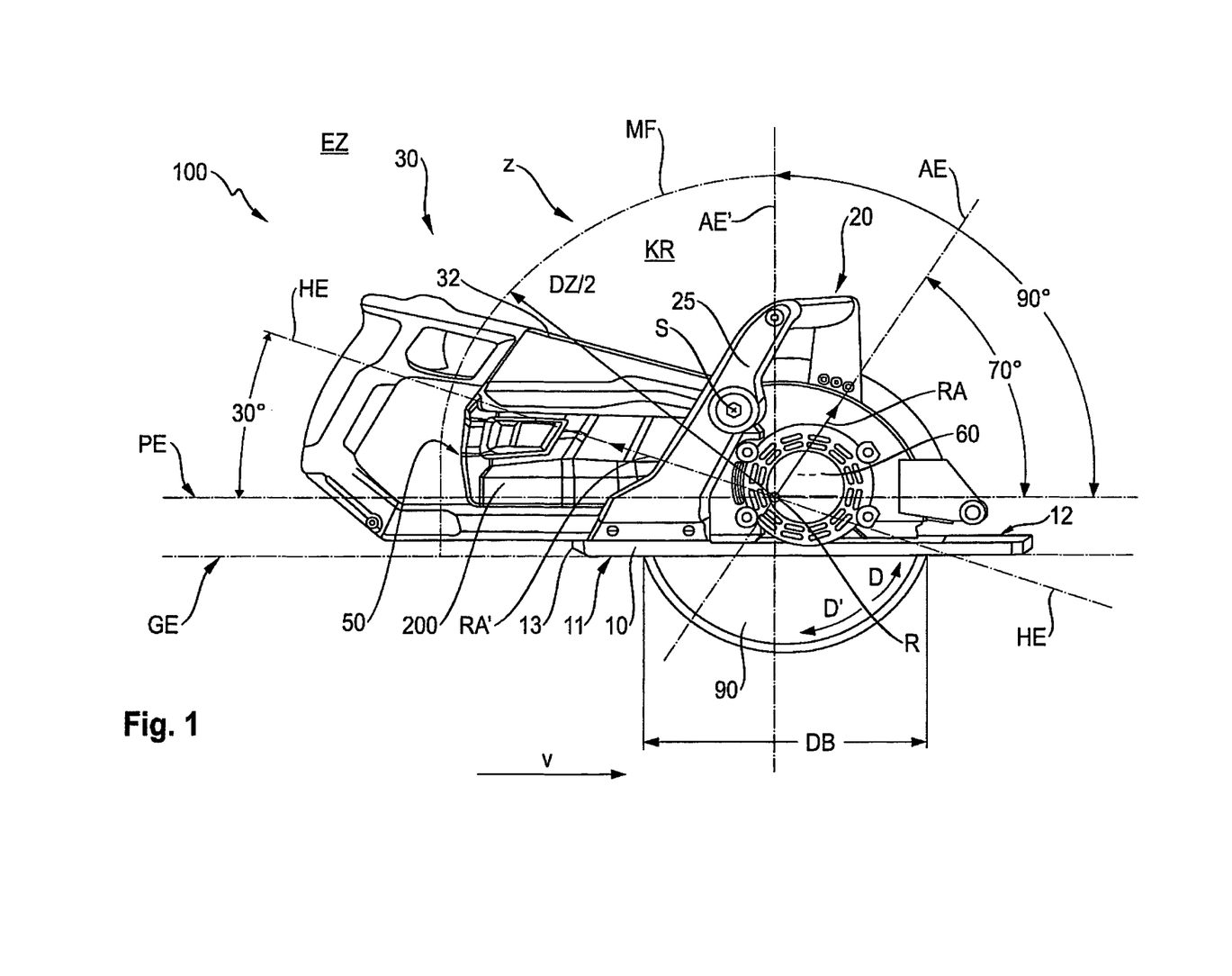
FIG. 1 illustrates a preferred embodiment of a battery-powered hand-held circular saw as a hand-held machine tool according to the invention, in a side view.

A preferred embodiment of a hand-held machine tool designed as a battery-powered hand-held circular saw 100 is shown in FIG. 1. The battery-operated circular saw 100 has an electric motor 60 for rotationally driving a tool 90 arranged on the hand-held circular saw 100 as a saw blade. The saw blade 90 is rotationally driven about an axis of rotation R, which in the present case points into the plane of the drawing. In normal sawing operation, the saw blade 90 rotates in the direction of rotation D. In other words, the saw blade 90 rotates in such a way that the hand-held circular saw 100 is used in the sawing operation on a workpiece to be sawn (not shown).

During normal operation, the hand-held circular saw 100 is advanced in the advancing direction V. The advancing direction is shown in FIG. 1 with a horizontal arrow pointing to the right. The hand-held circular saw 100 has a front handle 20 and a rear handle 30. Relative to the advancing direction V of the hand-held circular saw 100, the front handle 20 is arranged in front of the rear handle 30.

Furthermore, the hand-held circular saw 100 has a receiving recess 50 for receiving a replaceable battery 200. In the exemplary embodiment illustrated in FIG. 1, the replaceable battery 200 for operating the electric motor 60 of the hand-held circular saw 100 is completely received in the receiving recess 50.

According to the invention, the rear handle 30 is pivotably mounted about a pivot axis S. In FIG. 1, the pivot axis S in the image plane. The rear handle 30 is pivotably mounted about the pivot axis S such that when the rear handle 30 is in a state of being pivoted out (see FIG. 3), the receiving recess 50 is released to receive or remove the replaceable battery 200. Furthermore, the rear handle 30 is pivotally mounted about the pivot axis S such that when the rear handle 30 is located in the state of being pivoted in EZ (see FIGS. 1 and 2), the receiving or removal of the replaceable battery 200 into or out of the receiving recess 50 is blocked.

Figure 3:
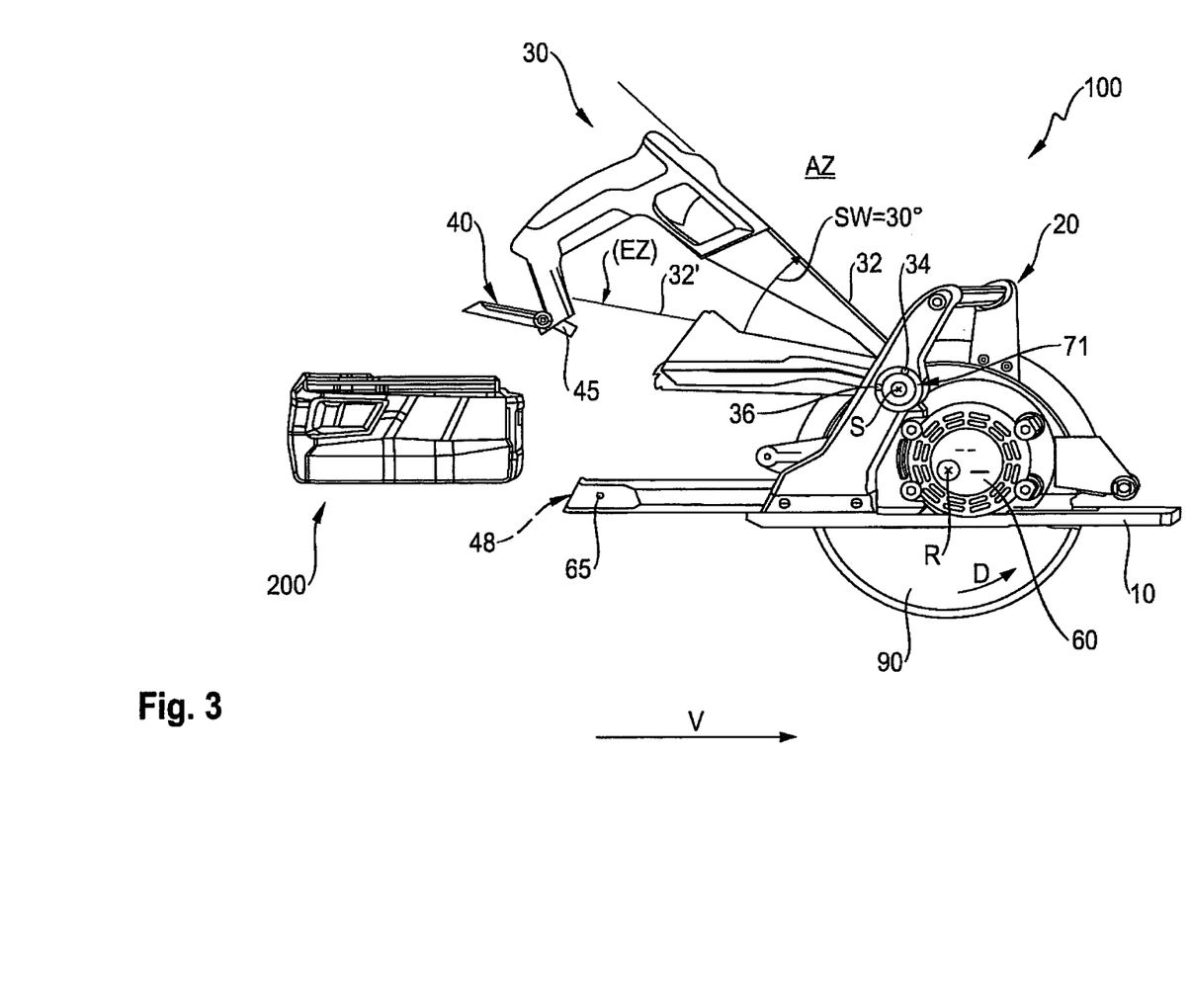
FIG. 3 is a side view of the embodiment of FIG. 1 with pivoted-out rear handle.

As can be seen from a combination of FIG. 1 and FIG. 3, the rear handle 30 is pivotally mounted upward, i.e. the rear handle 30 is in the state of being pivoted out AZ (FIG. 3), relative to the vertical, higher than the rear handle 30 in the state of being pivoted in EZ (FIG. 1).

In a preferred embodiment of FIG. 1, the pivot axis S is parallel to the axis of rotation R of the saw blade 90. This can be seen particularly clearly in the perspective views of FIGS. 2 and 4.

The pivot axis S extends exclusively above a ground plane GE. The ground plane GE can also be configured as a base plate plane. The ground plane GE corresponds thereby to the base plate plane. In this case, the hand-held machine tool 100 designed as a hand-held circular saw has a floor plate 10. The floor plate may also be referred to as a base plate. This is the case particularly if the hand-held machine tool contains a base plate. However, it is also possible for the hand-held machine tool 100 not to include a floor plate 10 or ground plate. A ground plane GE designed as a ground plane is defined by a floor plate 10 of the hand-held circular saw 100, which in working mode is touched by a workpiece underside 11 and is in a zero-degree position and which is set for maximum cutting depth. The ground plane GE defined by the bottom 11 of the floor plate 10 is also illustrated in the perspective view of FIG. 2.

In FIG. 1, a parallel plane PE running parallel to the ground plane GE is shown. The rotational axis R of the saw blade 90 pointing into the plane of the drawing lies in this parallel plane PE. The pivot axis S oriented parallel to the rotation axis R extends exclusively above this parallel plane PE.

Also shown in FIG. 1 is an axial plane AE, which is defined by the rotation axis R and by a radius RA of the saw blade 90. The axial plane AE encloses, starting from a section 12 of the base plate 10 located in the advancing direction V located in front of the axis of rotation R and in the direction of rotation D of the saw blade 90, an angle of 70°. For reasons of clarity, a second axial plane AE' is also shown in FIG. 1, which encloses an angle of 90°. In both cases, the pivot axis S is exclusively contained an inward-facing side facing the rear handle 30 of the axial plane AE, AE'.

Also shown in FIG. 1 is a section of a lateral surface MF of a cylinder Z defined coaxially to the axis of rotation R of the saw blade 90. In the illustrated embodiment, the cylinder Z has a diameter which is approximately twice as large as a maximum possible saw blade diameter DB of the saw blade 90 of the hand-held circular saw 100. In FIG. 1, the diameter DZ of the cylinder is referred to as DZ/2, since the segment is drawn only between the rotational axis R and lateral surface MF.

Also shown in FIG. 1 is a handle plane HE, which is spanned by the rotation axis R and a radius RA' of the saw blade 90. The handle plane HE closes, starting from a section 13 of the floor plate 10 located in the advancing direction V behind the axis of rotation R and counter to the direction of rotation D of the saw blade 90, by way of example, an angle of 30°. The pivot axis S extends exclusively in an inward-facing side of the handle plane HE facing a front handle 20.

The handle plane HE, the axial plane AE and the lateral surface MF define a pie-shaped area KR shown in the present embodiment, in which the pivot axis S, which is parallel to the axis of rotation R, runs exclusively.

As an already be discerned from FIG. 1, the pivot axis S extends through a handle carrier 25 of the front handle 20.

Figure 2:
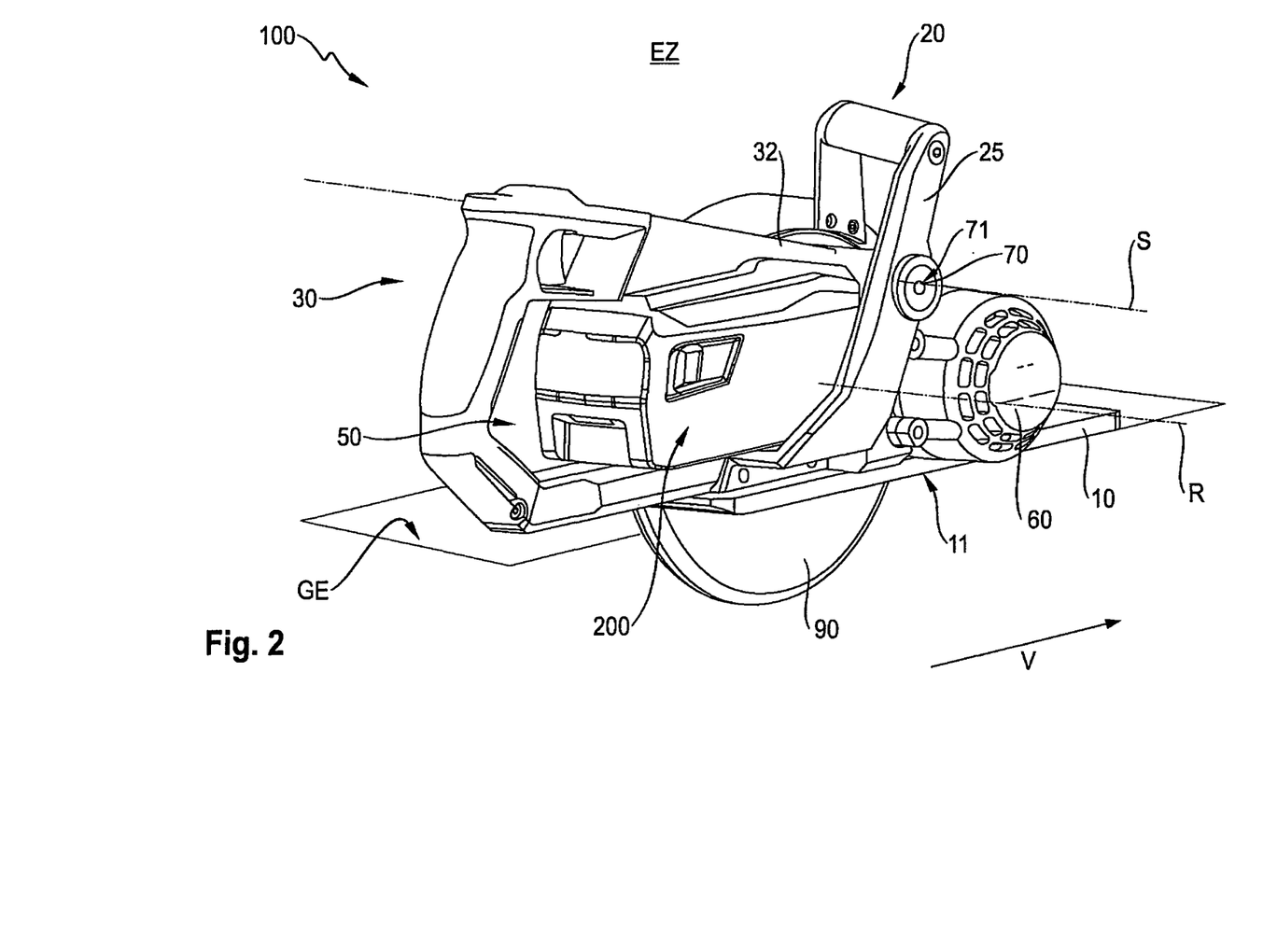
FIG. 2 is a perspective illustration of the embodiment of FIG. 1.

FIG. 2 shows now a perspective view of the hand-held machine tool 100 of FIG. 1, more precisely a view from the rear right with respect to the advancing direction V. The illustration of FIG. 2 shows that the saw blade 90 is arranged to the left of the electric motor 60. The already explained ground plane GE with reference to FIG. 1, which is spanned by the underside 11 of the floor plate 10 is drawn for reasons of clarity in the perspective view of FIG. 2.

As can also be easily discerned from FIG. 2, the pivot axis S extends parallel to the axis of rotation R.

With reference to FIG. 2, the attachment of the rear handle 30 to the hand-held machine tool 100 designed as a hand-held circular saw will now be explained in greater detail. In the present case, the pivot axis S extends through a handle carrier 25 of the front handle 20. On the handle support 25, the floor plate 10 is mounted, and as the electric motor 60 with its housing is attached. The rear handle 30 is pivotally supported by a cylindrical pin 70, which is coaxial with the pivot axis S, in a pin receptacle 71 of the handle support 25. For this purpose, a pivot section 32 of the rear handle 30 has a bore, not shown here, through which the cylinder pin 70 extends. FIG. 2 shows the rear handle 30 in the state of being pivoted in EZ, so that the receiving or removal of the replaceable battery 200 into or out of the receiving recess 50 is blocked.

FIG. 3 shows the embodiment of FIGS. 1 and 2, wherein in FIG. 3, the rear handle 30 is shown in its state of being pivoted out AZ. In the state of being pivoted out AZ, the receiving recess 50 is released for insertion or removal of the replaceable battery 200. In FIG. 3, the replaceable battery 200 is removed from the receiving recess.

With reference to FIG. 3, a pivot angle SW, which is defined between state of being pivoted in EZ and the state of being pivoted out AZ of the rear handle 30, will now be explained in greater detail.

In FIG. 3, a pivot stop 34 and a counter stop 36 are provided in the area of the pin receptacle 71 (see also FIG. 2), which limit the pivot angle SW. At a pivot angle of 0°, the rear handle 30 is in the state of being pivoted in EZ, which can be discerned, for example, FIGS. 1 and 2.

In FIG. 3, the state of being pivoted in EZ is shown only by suggesting the pivot section 32'. In the state of being pivoted in EZ of the pivot portion 32', which defines as the so-to-speak upwardly directed movement of the rear handle section 30, at an angle of about 20° to the horizontal. Starting from this state of being pivoted in EZ, the state of being pivoted out AZ is shown in FIG. 3 with a swivel angle of 30°. Of course, a pivot angle can also be related directly to the ground plane GE (cf. FIG. 1). In this case, the rear handle 30 shown in FIG. 3 would be pivoted out by about 50° relative to the ground plane GE.

In the following, with reference to FIG. 3, specific safety features of the hand-held machine tool 100 designed as a hand-held circular saw will be explained. At the rear handle 30 of the hand-held machine tool 100, a locking mechanism 40 is formed, with which the rear handle 30 can be fixed in its state of being pivoted in EZ and, if necessary, released for a pivoting movement. On the locking mechanism 40, a mechanical switching element 45 is formed, which can engage in a corresponding recess 48. As can be discerned from FIG. 4, the recess 48 for the mechanical switching element 45 is formed on a stabilizing rail 59, which protrudes beyond the receiving recess 50 counter to the advancing direction V. In the state of being pivoted in EZ, the switching element 45 is received in the recess 48, which is shown in dashed lines in FIG. 5.

Shown again in FIG. 3 is a safety switch 65, which is connected to the rear handle 30 and arranged within the stabilizing rail 59 in the embodiment shown in FIG. 3. The safety switch 65 is designed to interrupt a power supply to the electric motor 60 in the unlocked state of the locking mechanism 40 and in the presence of the state of being pivoted out AZ. If the locking mechanism 40 is locked, or the rear handle 30 is pivoted in, as is the case in FIG. 5, the safety switch 65 signals that the electric motor 60 may be actuated.

Figure 4:
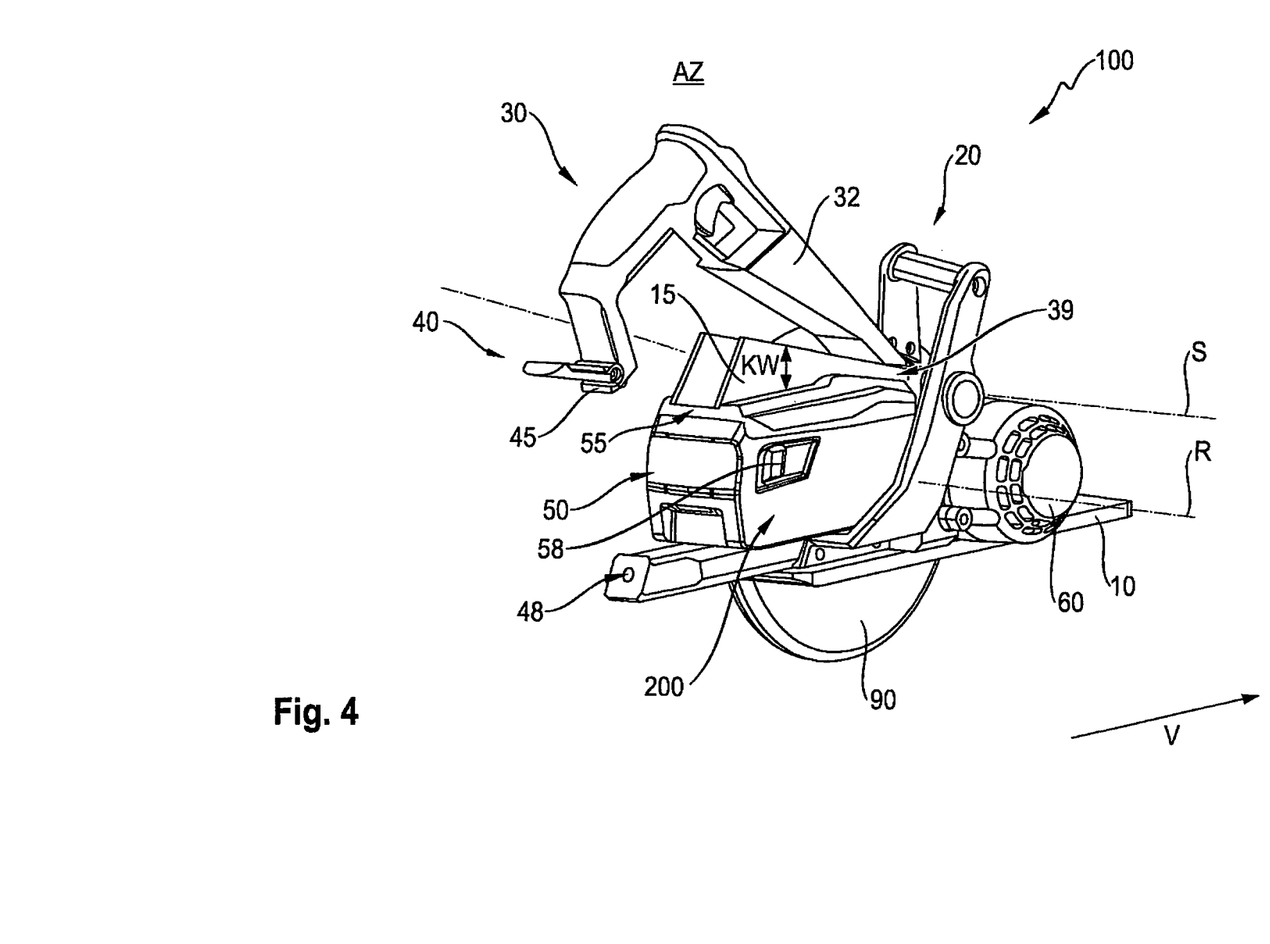
FIG. 4 is a perspective illustration of the view of FIG. 3.

As can likewise be discerned from FIG. 4, the hand-held machine tool 100 designed as a hand-held circular saw has a U-shaped profile rail 15. This rail is designed to receive the pivot section 32 of the rear handle 30. If the pivot section 32 is received in the profiled rail 15, that is to say in the state of being pivoted in EZ (cf., FIG. 5), the rear handle 30 is secured against undesired rotation transversely to the pivot axis S. As can be discerned from FIG. 4, the U-shaped profile rail 15 has a wedge-shaped configuration, by way of example with a wedge angle KW of approximately 20°.

Below the U-shaped rail 15, a rail guide 55 is formed, via which the replaceable battery 200 can be received into the receiving recess 50 and removed from it. The rail guide 55 is designed such that a removal of the replaceable battery 200 is only possible after actuation of a release element 58 on the replaceable battery 200. Not visible in FIG. 4, a locking lug actuated by the release element 58 protrudes into a corresponding recess on the underside of the U-shaped profile rail 15.

The hand-held circular saw 100 further includes a not shown detent mechanism 39 which is designed to securely hold the rear handle 30 in the illustrated state of being pivoted out AZ until the spring-locking force is it overcomes by the user.

Figure 5:
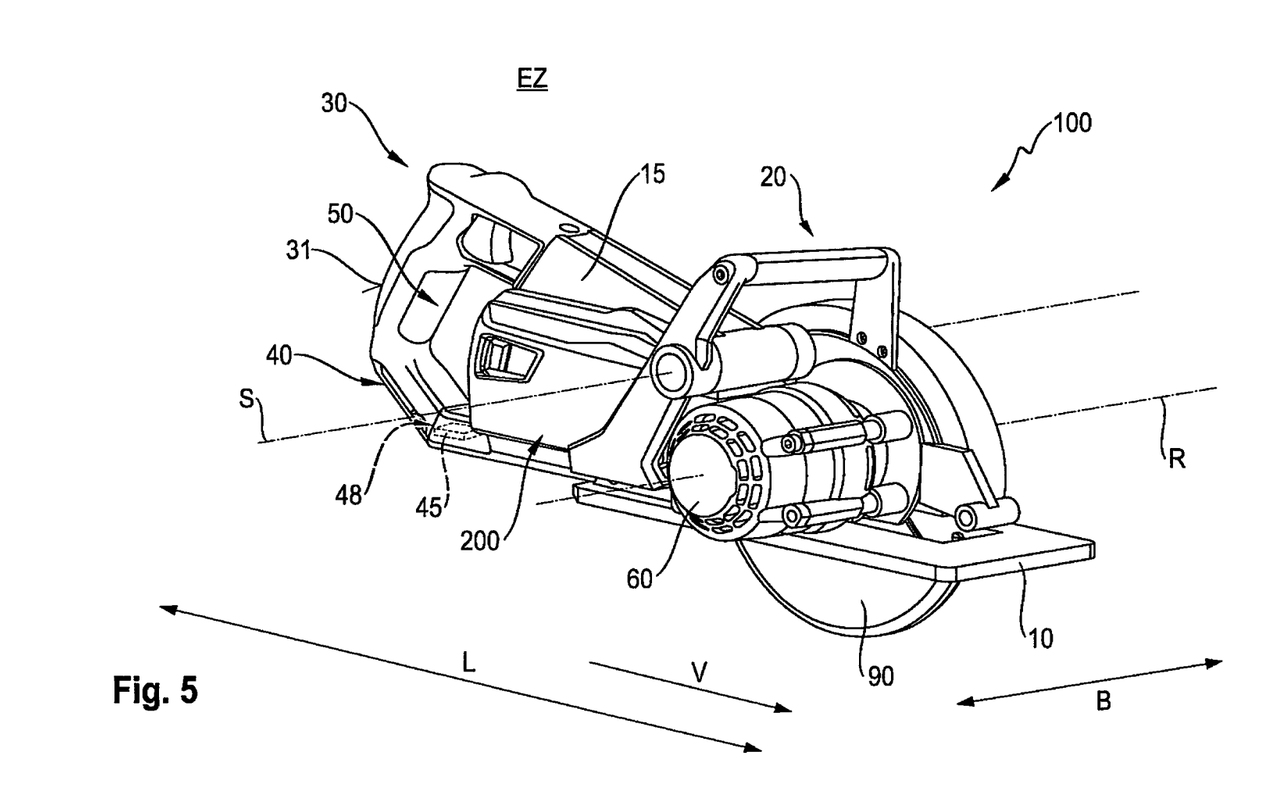

FIG. 5 shows a perspective view of the above-described hand-held machine tool 100 from the front right. The locking mechanism 40 is locked in the present case, that is, the switching element 45 is received in the recess 48.

Furthermore, it can be clearly identified in FIG. 5 that a hand engagement surface 31 of the rear handle 30, relative to the advancing direction V of the hand-held machine tool 100, is added behind the replaceable battery received in the receiving recess 50. Furthermore, it can be clearly identified in FIG. 5 that the tool 90 designed as a saw blade, with reference to the advancing direction V of the hand-held machine tool 100, is arranged to the left of the electric motor 60. Alternatively, the tool 90 designed as a saw blade, with reference to the advancing direction V of the hand-held machine tool 100, can also be arranged to the right of the electric motor 60.

A motor shaft 61 of the electric motor 60 indicated in FIG. 5 runs parallel to the axis of rotation R of the saw blade 90. A maximum length L of the hand-held machine tool 100 designed as a hand-held circular saw, relative to the advancing direction V, is at least twice as long as a maximum width B of the hand-held machine tool 100 designed as a hand-held circular saw, perpendicular to the advancing direction V.

Figure 6:
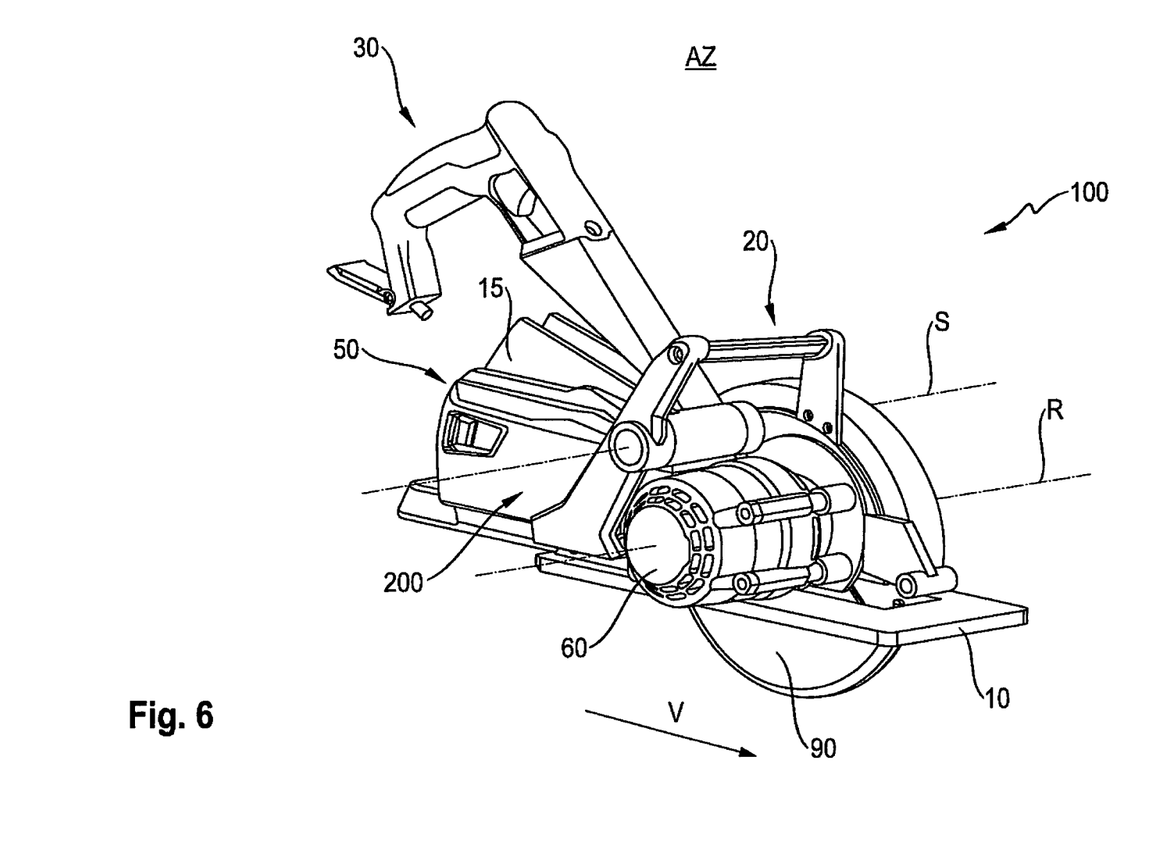
FIG. 6 illustrates the hand-held machine tool of FIG. 5 designed as a battery-powered hand-held circular saw with pivoted-out rear handle.

Finally, FIG. 6 shows the hand-held machine tool 100 from the same perspective as in FIG. 5, with the rear handle 30 being shown in the state of being pivoted out AZ for better clarification of the U-shaped profiling of the profile rail 15.

LIST OF REFERENCE SYMBOLS

10 Floor plate
11 Underside of the floor plate
12 Leading section
13 Trailing section
15 Profile rail
20 Front handle
25 Handle carrier of the front handle
30 Rear handle
31 Hand engagement surface
32, 37' Pivot section
34 Pivot stop
36 Counterstop
39 Detent mechanism
40 Locking mechanism
45 Mechanical switching element
48 Recess
50 Receiving recess
55 Rail guide
58 Release element
59 Stabilizing rail
60 Electric motor
61 Motor shaft
65 Safety switch
70 Cylinder pin
71 Pin receptacle
90 Tool
100 Hand-held machine tool
200 Replaceable battery
AE, AE' Axial plane
B Maximum width of the hand-held machine tool
DB Maximum tool diameter
DZ Cylinder diameter
GE Ground plane
KR Pie-shaped area
L Maximum length of the hand-held machine tool
MF Lateral surface
PE Parallel plane
D, D' Direction of rotation
R Axis of rotation
S Pivot axis
SW Pivot angle
V Advancing direction
Z Cylinders

The invention claimed is:
1. A hand-held machine tool, comprising:
an electric motor for rotationally driving a tool disposed on the hand-held machine tool;
a front handle and a rear handle with respect to an advancing direction of the hand-held machine tool; and a receiving recess for receiving a replaceable battery;
wherein the rear handle is pivotably mounted about a pivot axis such that the rear handle is pivotable out upwards, wherein when the rear handle is in a pivoted out state the receiving recess is released for insertion or removal of the replaceable battery and wherein when the rear handle is in a pivoted in state the insertion or the removal of the replaceable battery into or out of the receiving recess is blocked;
wherein the pivot axis is oriented parallel to a rotation axis of the tool, above a ground plane, and above a parallel plane running parallel to the ground plane, wherein the ground plane is defined by an underside of a floor plate of the hand-held machine tool which contacts a workpiece in an operating mode of the hand-held machine tool.

2. The hand-held machine tool according to claim 1, wherein the pivot axis extends in an inward-facing side of an axial plane facing the rear handle, wherein the axial plane is defined by the rotation axis and a radius of the tool, wherein the axial plane, starting from a section of the floor plate lying in the advancing direction in front of the rotation axis and in a direction of rotation of the tool, encloses an angle of at least 70 degrees and at most 90 degrees.

3. The hand-held machine tool according to claim 1, wherein the pivot axis extends through a handle support of the front handle and is supported by a cylindrical pin mounted in a pin receptacle.

4. The hand-held machine tool according to claim 1, wherein a pivot angle limited by a pivot stop and a counter stop between the pivoted in state and the pivoted out state of the rear handle, starting from a section of the floor plate located in the advancing direction behind the rotation axis and counter to a direction of rotation of the tool, is greater than 20° and less than 60°.

5. The hand-held machine tool according to claim 1 further comprising a latching mechanism, wherein the latching mechanism securely holds the rear handle in the pivoted out state until a user overcomes a spring-locking force.

6. The hand-held machine tool according to claim 1, wherein the rear handle has a locking mechanism, wherein the locking mechanism fixes the rear handle in the pivoted in state.

7. The hand-held machine tool according to claim 6, wherein below the receiving recess, a stabilizing rail is disposed which protrudes counter to the advancing direction beyond the receiving recess and on which the rear handle is fixable in the pivoted in state.

8. The hand-held machine tool according to claim 7, wherein the locking mechanism comprises a mechanical switching element which is engageable in a recess on the stabilizing rail when the rear handle is in the pivoted in state.

9. The hand-held machine tool according to claim 6, wherein a safety switch is connected to the rear handle and interrupts a power supply to the electric motor in an unlocked state of the locking mechanism and/or when the rear handle is in the pivoted out state.

10. The hand-held machine tool according to claim 1 further comprising a U-shaped profiled rail which receives a pivotal section of the rear handle in a form-fitting manner at least transversely to the pivot axis when the rear handle is in the pivoted in state.

11. The hand-held machine tool according to claim 1, wherein the receiving recess has a rail guide via which the replaceable battery is receivable into and removable from the receiving recess, wherein the rail guide and/or the replaceable battery is configured such that removing of the replaceable battery is possible only after actuation of a release element.

12. The hand-held machine tool according to claim 1, wherein a hand engagement surface of the rear handle, relative to the advancing direction of the hand-held machine tool, is provided behind the replaceable battery received in the receiving recess.

13. The hand-held machine tool according to claim 1, wherein the tool, relative to the advancing direction of the hand-held machine tool, is disposed to a left of the electric motor, wherein an output shaft of the electric motor runs parallel to the rotation axis, and wherein the hand-held machine tool is at least twice as long as wide.

14. The hand-held machine tool according to claim 1, wherein the tool, relative to the advancing direction of the hand-held machine tool, is disposed to a right of the electric motor, wherein an output shaft of the electric motor runs parallel to the rotation axis, and wherein the hand-held machine tool is at least twice as long as wide.

15. A hand-held machine tool, comprising:
an electric motor for rotationally driving a tool disposed on the hand-held machine tool;
a front handle and a rear handle with respect to an advancing direction of the hand-held machine tool; and
a receiving recess for receiving a replaceable battery;
wherein the rear handle is pivotably mounted about a pivot axis such that the rear handle is pivotable out upwards, wherein when the rear handle is in a pivoted out state the receiving recess is released for insertion or removal of the replaceable battery and wherein when the rear handle is in a pivoted in state the insertion or the removal of the replaceable battery into or out of the receiving recess is blocked;
wherein the pivot axis extends in an inward-facing side of a handle plane facing the front handle, wherein the handle plane is defined by a rotation axis and a radius of the tool, wherein the handle plane, starting from a section of a floor plate of the hand-held machine tool which contacts a workpiece in an operating mode of the hand-held machine tool lying in the advancing direction located behind the rotation axis and counter to a direction of rotation of the tool, encloses an angle of at least 20 degrees.

* * * * *